United States Patent Office 3,671,159
Patented June 20, 1972

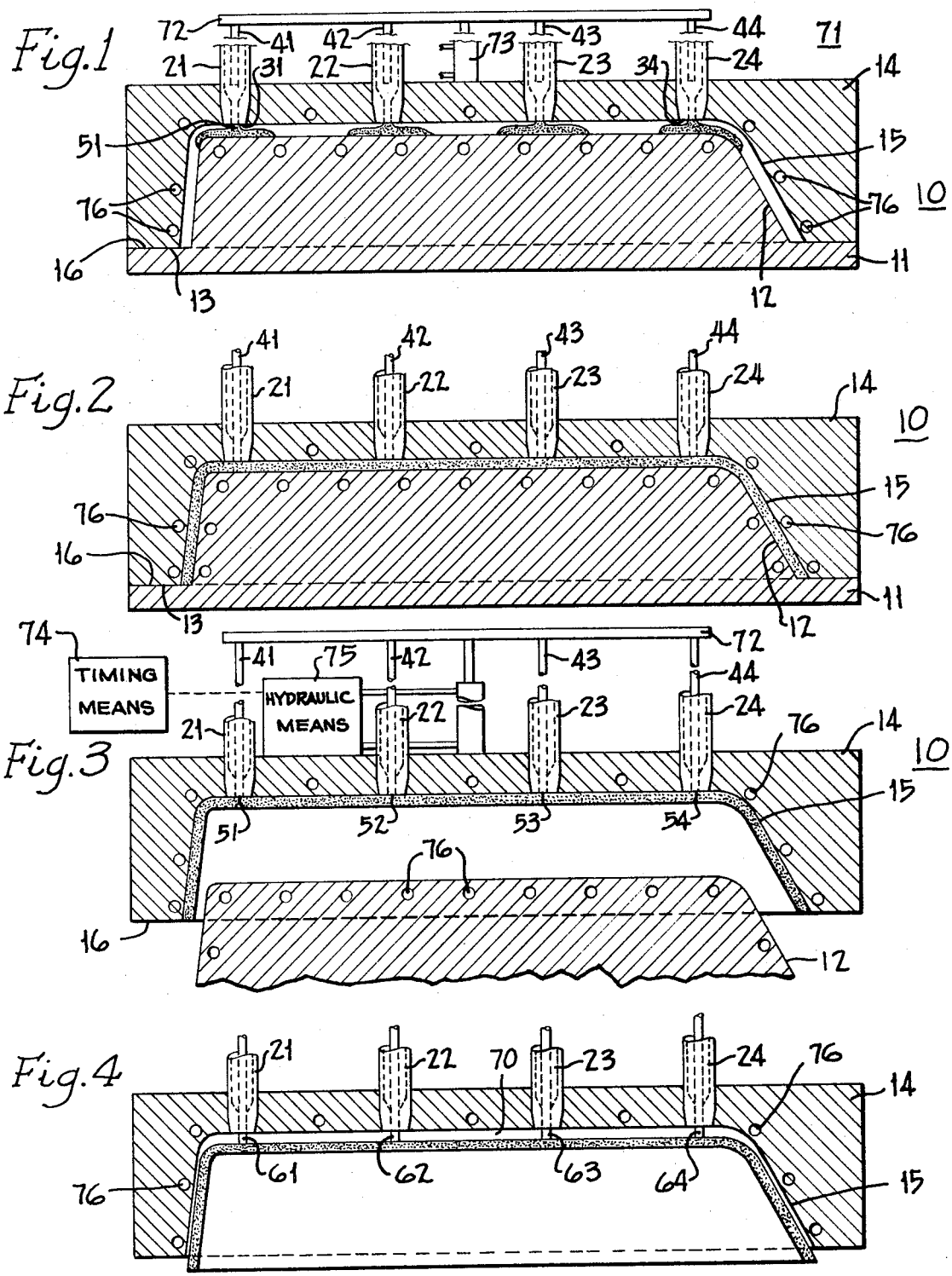

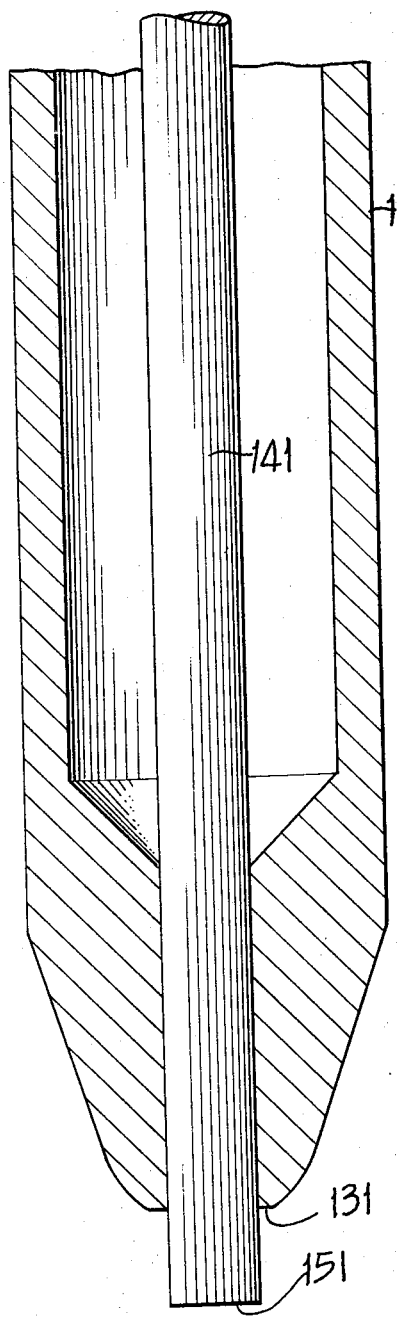
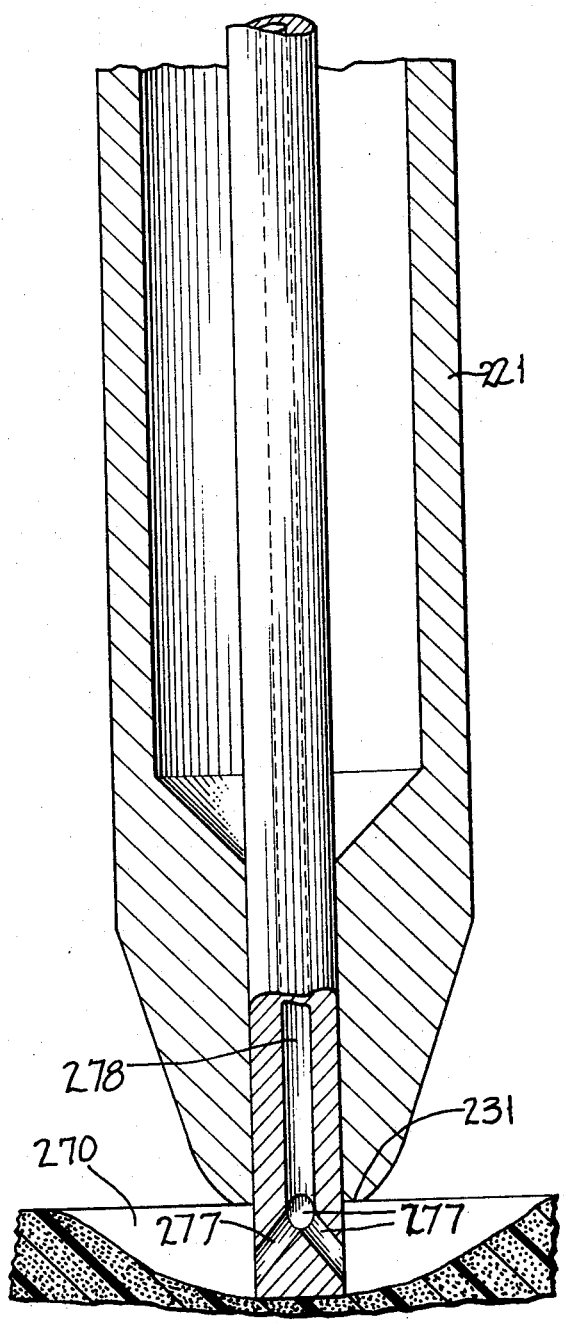

3,671,159
EJECTING GIANT ARTICLES FROM INJECTION MOLD
Walter H. Greenberg, Syosset, N.Y., and Walter D. Voelker, Philadelphia, Pa. (both of 220 Miller Road, Hicksville, N.Y. 11801)
Filed Mar. 6, 1970, Ser. No. 17,253
Int. Cl. B29f 1/14
U.S. Cl. 425—155                                    1 Claim

ABSTRACT OF THE DISCLOSURE

Apparatus for molding giant plastic articles of cellular plastic includes a plurality of injection nozzles having plungers which are generally kept at their advanced position with the plunger tips at the nozzle tips. After the article is adequately cooled by the cold liquid in heat transfer conduits, a timing means controls an actuating means to shift a plurality of the plungers of the nozzles to a super-advanced position, thereby knocking out the giant article from the fixed portion of the mold. Compressed gas jets from adjacent the tips of the plungers desirably accelerate the enlargement of the separation zones for deadhering the giant article from the fixed portion of the mold.

GENERAL BACKGROUND

Plastic articles weighing more than about two kilograms are designated as giant articles, and are molded by techniques significantly different from those suitable for conventional plastic articles. Mixtures of gas and molten plastic can be injected at moderately low pressures into molds featuring heat transfer conduits adapted to cool the article quickly. The cooled article has a propensity to adhere to the fixed portion of the mold, and can remain hung up in the fixed portion of the mold after the shifting away of the movable portion of the mold. Any unreliability concerning the removal of the article from the mold jeopardizes the feasibility of timed operation of the molding equipment, and thus disrupts the basic concept of automatic molding machines. Notwithstanding the licensing of many companies and the existence of several manufacturers of machinery for the molding of products from the mixture of gas and molten plastic, no satisfactory answer to the problem of reliably removing the article from the mold has been found.

SUMMARY OF INVENTION

In accordance with the present invention, a timing means permits the giant article to remain in the mold until it has cooled sufficiently to be hit without distortion, and then a plurality of plungers are advanced from their nozzle tips to a superadvanced position from about 0.1 to about 1.0 inch from the nozzle tips, and such plungers effectively deadhere the article from the adjacent contoured wall of the fixed portion of the mold. In preferred embodiments each plunger has a central passageway through which compressed gas flows to orifices adjacent the tip of the plunger, and the orifices direct jets in a plurality of directions toward the contoured wall of the mold, thus accelerating the enlargement of the separation zones for deadhering the article from its mold.

DESCRIPTION OF DRAWINGS

FIGS. 1–4 are schematic showing of four steps of the method of injection molding an article and thereafter ejecting it from the mold.

FIG. 5 is a schematic view of a portion of an injection nozzle tip.

FIG. 6 is a schematic view of an alternative embodiment of the nozzle tip of FIG. 5.

DESCRIPTION OF EMBODIMENTS

As shown in FIGS. 1–4, a molding apparatus 10 for molding a giant article such as a two pasenger boat can include a movable portion 11 having a contoured wall 12. A parting line 13 between the movable portion 11 and fixed portion 14 of the mold is one of the characteristics considered in mold design. A flat surface 13 on movable portion 11 matches a flat surface 16 on fixed portion 14 of the mold. The giant article, such as said boat, is molded in the cavity between the contoured wall 12 of the movable portion and the contoured wall 15 of the fixed portion of the mold.

In most injection molding systems of earlier decades, only a single injection nozzle was employed, but in molding giant articles, there are a plurality of nozzles, designated as 21–24. Each nozzle is generally the same as another, and the numbering connotes that there may be whatever plurality of nozzles is deemed appropriate by the designer of the apparatus and mold. A nozzle tip 31 desirably extends to the fixed contoured wall 15, thus eliminating sprues. A plunger 41 is positioned with its tip 51 approximately aligned at or near the nozzle tip 41 during most of the molding cycle, but is withdrawn therefrom to a retracted position during the flow of a mixture of gas and plastic into the mold, as shown in FIG. 1. After the mold has been filled with plastic, cold liquid is circulated through heat transfer conduits 76 just behind the contoured walls 12, 15 to cool the article sufficiently that permanent deformation of its surface would not result from a hitting of the article. The cooling article is shown in FIG. 2. After the boat has been adequately cooled, the movable portion 11 shifts away from the fixed portion 14, as shown in FIG. 3.

Particular attention is directed to that feature of FIG. 3 showing the boat hung up in the fixed portion of the mold as a result of the adhering of the freshly molded article to the contoured wall 15 of the fixed portion 14 of the mold. Such adhering can be extremely troublesome in the molding of giant articles, even if it occurs only occasionally, by reason of its disruption of the normal timing of the molding cycle. By reason of the large area of the giant article and the relatively light weight of the cellular plastic, relatively minor adhering forces can be quite troublesome. As shown in FIG. 4 the boat is knocked out of the fixed portion of the mold when the plungers 41–44 are actuated to superadvanced positions designated as 61–64, thus creating separation zones which enlarge to form a complete separation zone 70. Such superadvanced position of the plunger tip is from about 0.1 to about 1 inch beyond the nozzle tip. A hydraulic means 75 can be employed in actuating the shifting of the plurality of plungers to the superadvanced position, and can be a modification of the same hydraulic means employed for the normal reciprocation of the plungers to and from the plastic flow position (shown schematically in FIG. 1) permitting the plastic to flow in the mold. The hydraulic means 75 can actuate a cylinder 73 which moves a control bar 72 shifting the plurality of plungers 41, 42, etc., as shown in FIG. 3. The step of returning the plunger tips from their superadvanced positions to a conventional position after being briefly actuated to said superadvanced position can consist of the same bar 72, cylinder 73 and hydraulic system 75 employed for the forward movement. When programmed to function as a returning means, such apparatus can be deemed a withdrawing means different from the superadvancing means. As shown in FIG. 5, a nozzle 121 has a tip 131, and the plunger 141 can be extended so that its tip 151 is at a superadvanced position beyond the nozzle tip 131.

A modification of the system of FIGS. 1-5 is shown in FIG. 6. A plunger can have a bore 278 supplying compressed gas to orifices 277 adjacent the plunger tip for directing compressed gas in a plurality of directions for enlarging a separation zone 270. The cellular plastic can be resiliently deformed, thus providing opportunities not available in molding rigid noncellular plastics. The compressed gas can be effective in enlarging the zone of separation 270 by resiliently deforming the growing edge of the separation zone. Inasmuch as there are a plurality of such zones of separation, the action of the compressed gas jets can be effective in deadhering the article from the fixed contoured wall than might be feasible in deadhering rigid articles from a mold.

When jets of compressed gas are employed, the method of deadhering the giant article from the fixed portion of the mold can be described as including the step of injecting gas in a plurality of directions to resiliently deform the giant article, thereby enlarging each of a plurality of separation zones for deadhering the giant article from the contoured wall of the fixed portion of the mold.

The invention claimed is:

1. In low pressure molding apparatus the combination of:

means directing a mixture of gas and molten plastic to flow into a mold through a plurality of generally parallel injection nozzles, each injection nozzle comprising a nozzle tip;

a reciprocating plunger having a tip aligned near the nozzle tip during a significant portion of the molding cycle;

means directing cooling liquid to flow through heat transfer conduits after the mold has been filled with plastic to cool a giant plastic cellular article prior to separation of the mold, said giant cellular plastic article having a propensity to adhere to the fixed portion of the mold;

a single control bar for actuating each of a plurality of plungers to a super-advanced position extending from about 0.1 to about 1 inch from the nozzle tip, each plunger having a compressed air conduit and a plurality of orifices near the plunger tip, said orifices directing jets of compressed air in a plurality of directions to enlarge the zone of separation for deahering the giant article from the contoured wall of the fixed portion of the mold;

means for timing said actuation of the control bar so that the plurality of plungers are not actuated until the giant cellular plastic article has cooled sufficiently to not be permanently distorted by a hit by the tip of the plunger; and means for withdrawing thep lunger tips after being briefly actuated to said super-advanced position.

References Cited

UNITED STATES PATENTS

| | | | |
|---|---|---|---|
| 2,828,507 | 4/1958 | Strauss | 18—30 RV |
| 2,923,976 | 2/1960 | Strauss | 18—30 RP X |
| 2,320,583 | 6/1943 | Forro | 18—2 RC UX |
| 2,505,540 | 4/1950 | Goldhard | 18—30 NZ UX |
| 2,671,933 | 3/1954 | Nye | 18—2 RP X |

FOREIGN PATENTS

| | | | |
|---|---|---|---|
| 1,274,579 | 9/1961 | France | 18—30 NZ |
| 1,091,885 | 11/1967 | Great Britain | 18—30 WJ |

J. SPENCER OVERHOLSER, Primary Examiner

M. O. SUTTON, Assistant Examiner

U.S. Cl. X.R.

425—245, 248, 437

UNITED STATES PATENT OFFICE
CERTIFICATE OF CORRECTION

Patent No. 3,671,159　　　　　　　　　　Dated June 20, 1972

Inventor(s) Walter H. Greenberg & Walter D. Voelker

It is certified that error appears in the above-identified patent and that said Letters Patent are hereby corrected as shown below:

In the heading, after the names of the inventors, insert:

--assignors to Bischoff Chemical Corporation Hicksville, N.Y. --

Signed and sealed this 8th day of May 1973.

(SEAL)
Attest:

EDWARD M. FLETCHER, JR.　　　　　　　ROBERT GOTTSCHALK
Attesting Officer　　　　　　　　　　　Commissioner of Patents